(12) United States Patent
Shrivastav

(10) Patent No.: US 8,990,123 B2
(45) Date of Patent: Mar. 24, 2015

(54) SYSTEM AND METHOD OF ANONYMOUS MESSAGING, REVIEWING, QUANTIFYING, MATCHING AND SEARCHING PEOPLE ON MAP

(71) Applicant: Ashutosh Shrivastav, Somerville, MA (US)

(72) Inventor: Ashutosh Shrivastav, Somerville, MA (US)

( * ) Notice: Subject to any disclaimer, the term of this patent is extended or adjusted under 35 U.S.C. 154(b) by 100 days.

(21) Appl. No.: 13/966,703

(22) Filed: Aug. 14, 2013

(65) Prior Publication Data
US 2015/0052204 A1    Feb. 19, 2015

(51) Int. Cl.
*G06Q 99/00*  (2006.01)
*G06F 15/16*  (2006.01)
*H04L 12/58*  (2006.01)

(52) U.S. Cl.
CPC ..................................... *H04L 51/32* (2013.01)
USPC .......................................... 705/319; 709/206

(58) Field of Classification Search
USPC ........................................... 705/319; 709/206
See application file for complete search history.

(56) References Cited

U.S. PATENT DOCUMENTS

| | | | |
|---|---|---|---|
| 8,566,327 B2 * | 10/2013 | Carrico et al. ................. 707/748 |
| 2006/0256959 A1 * | 11/2006 | Hymes ..................... 379/433.04 |
| 2007/0069901 A1 * | 3/2007 | Tuck et al. .................. 340/573.1 |
| 2009/0326967 A1 * | 12/2009 | Kalaboukis ....................... 705/1 |
| 2010/0077032 A1 * | 3/2010 | Drennan et al. .............. 709/206 |
| 2012/0290978 A1 * | 11/2012 | Devecka ....................... 715/810 |
| 2013/0137464 A1 * | 5/2013 | Kramer et al. .............. 455/456.3 |
| 2013/0238708 A1 * | 9/2013 | Bustamente .................. 709/204 |
| 2013/0316735 A1 * | 11/2013 | Li et al. ...................... 455/456.3 |

* cited by examiner

*Primary Examiner* — Kenny Lin

(57) ABSTRACT

The present invention relates to computer-implemented services and user interfaces for allowing users to send a request or message to another user or anyone with an email address without disclosing her or her identity, match friends, tag people with certain attributes to generate a social percentile, and review connections. The invention also relates to methods for sending a request or message anonymously, generating a social percentile with attribute tagging, reviewing individuals and matching a member with another individual.

16 Claims, 9 Drawing Sheets

Fig 7

SYSTEM AND METHOD OF ANONYMOUS MESSAGING, REVIEWING, QUANTIFYING, MATCHING AND SEARCHING PEOPLE ON MAP

FIELD OF THE INVENTION

The present invention relates to computer-implemented services and user interfaces for allowing users to send a request or message anonymously, match friends, tag people with attributes and generate social score. The invention also relates to methods for sending the request or message anonymously, generating a social percentile, recommending another individual and matching a member with another individual.

BACKGROUND ON THE INVENTION

The web offered numerous dating sites for individuals, but the websites could not understand the personality of individuals. In order to build a user's personality profile, websites such as Match.com, asked the users to answer a series of questions to get an insight on their personality so that they could match them with another user based on the results of the answers. Similarly, web also offered several social networking websites but they did not quantify individuals or enhance users' credibility. In addition, there is a large population of who are introverts or simply shy. These introverts or shy people want to disguise their profile when approaching a potential date. This invention addresses the need of introverts to disguise their identity so that there is no fear of rejection, allows friends and family to match you with a date, quantify the quality of your personality with a social score.

Whereas the main focus of social networking sites is on social relations, dating sites bet on finding a suitable match for you. By mixing these two components, this invention introduces the concept of "Social Dating". It is the only invention that also employs the approach of using friends and families to find suitable match for you instead of match making algorithms used by other dating sites. Also, unlike other dating websites, this invention lets user's friends and family members take initiative in finding a match online which ensures sanity of the prospective match.

SUMMARY OF THE INVENTION

The present invention addresses the above and other problems by providing solutions. These features may be implemented individually, or in an appropriate combination. These services may be implemented through a web site or a mobile device application.

This invention introduces following features as a new solutions.

One feature of the invention involves sending a request or message anonymously to a crush or a potential date. It anonymizes your identity when you send a request. This avoids the fear of rejection that you would have, it discloses mutual crushes, and eliminates "what if" scenarios.

Another feature of the invention allows members to match a member with another individual. The people who really know you most closely are your friends, families and relatives. The match making feature allows your families, relatives and friends to match you with someone they know and, who they think would be a good match for you. This eliminates the poor dating experience that other sites provide because you don't usually know the personality of the person you are about to meet, their background and the missing mutual social connection.

Another feature of the invention introduces a platform for members to write a personal recommendation for the people that you know best with much accurate description. It helps establish a user's personality and credibility online. This tool will be proven very valuable for the users because first, it helps to assess the personality of a user at a glance and second, it quantifies the credibility for all users. User profile consists of personal recommendations and keywords that represent the overall personality of a user. Users who have never been a part of social groups will also see their relative value compared to their friends and families. Users would like to be quantified and try to improve their score, make more social matches for their friends and families, and send causal anonymous requests.

BRIEF DESCRIPTION OF THE DRAWINGS

FIG. 2 also displays a list of any requests received by the user. Clicking on request will open request details where the receiver acts on the request as explained in FIG. 4 and FIG. 5.

Figure 7:
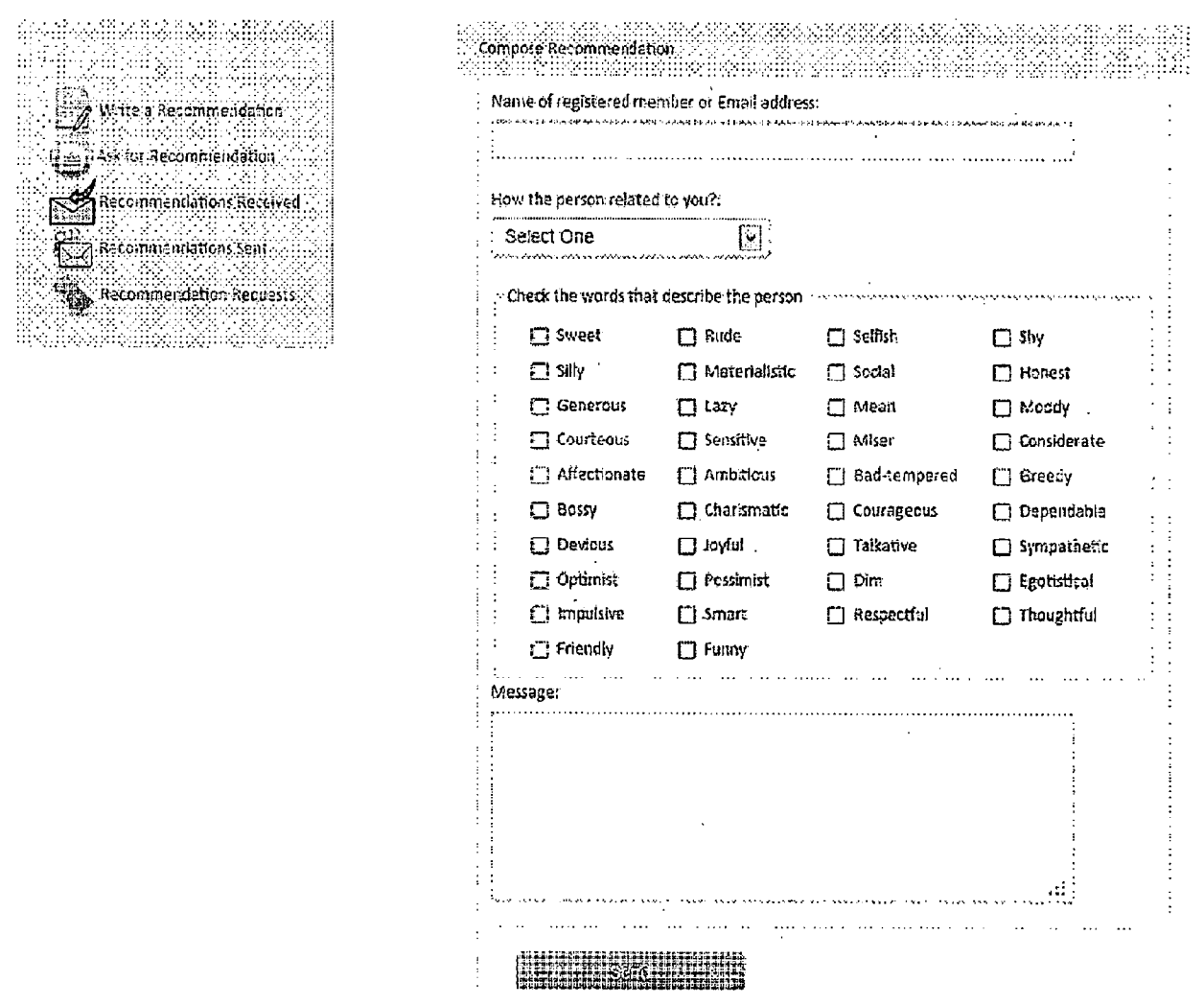

FIG. 7 is the web interface for writing a review, tagging with attributes and generating Social Percentile.

DETAILED DESCRIPTION

1. Send Anonymous Requests

This process anonymizes the identity of the sender. The identity of the sender is not disclosed unless the receiver chooses the sender. Once the sender initiates a request, the request loops around to find the match among the social circle. The loop breaks once the request finds a match or it is deleted by a receiver. There are many people who never dared to express their feelings for their crush because they were either introvert, shy or feared rejection. In some instances, there were mutual crushes but they both feared rejection and as a result, they never approached their crush. Some have found that they had mutual crush only after they were married to others for several years. Many individuals have been through this situation of awkwardness. By using this invention, you are not at risk of being rejected. The feature eliminates that uncertainty. This prevents any awkwardness that might arise between the two of you if only you have feelings for the receiver. If the receiver has the same feelings as you do, the method discloses it to both of you.

Once you log in to your account, you are able to send a request for coffee, biking or group study to another user of opposite gender. For example, if you, a male, send a request to a female, she receives a request in email and on the web under "incoming requests" that one of the members is interested in having coffee with her. If receiver selects you, both you and her are notified. If she chooses someone other than you, the request goes in loop and a new receiver receives the same type of request as the step above.

Example
User A=Male, User B=Male, User C=Female

Figure 1:
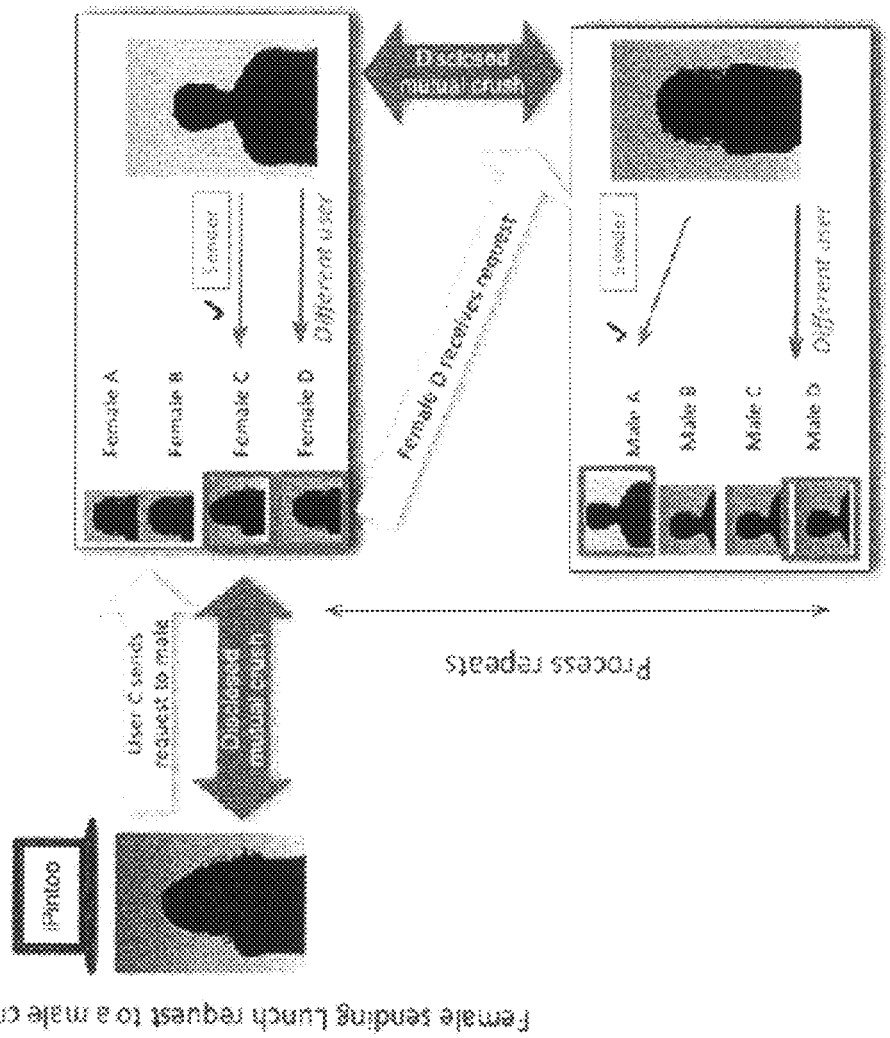
FIG. 1 explains the process of sending a request anonymously. In this example, a female user C is sending a lunch request to a male user. Male user may or may not exist or be a registered user of the system. If Male receiver chooses female user C, mutual crush is disclosed. If Male receiver selects Female user D instead, Female user D receives a request for lunch that includes the Male (the previous receiver) and other male profiles. She also gets a notification of incoming request in her email. The receiver becomes the sender if he/she selects the profile other than the sender from the list.
Figure 2:
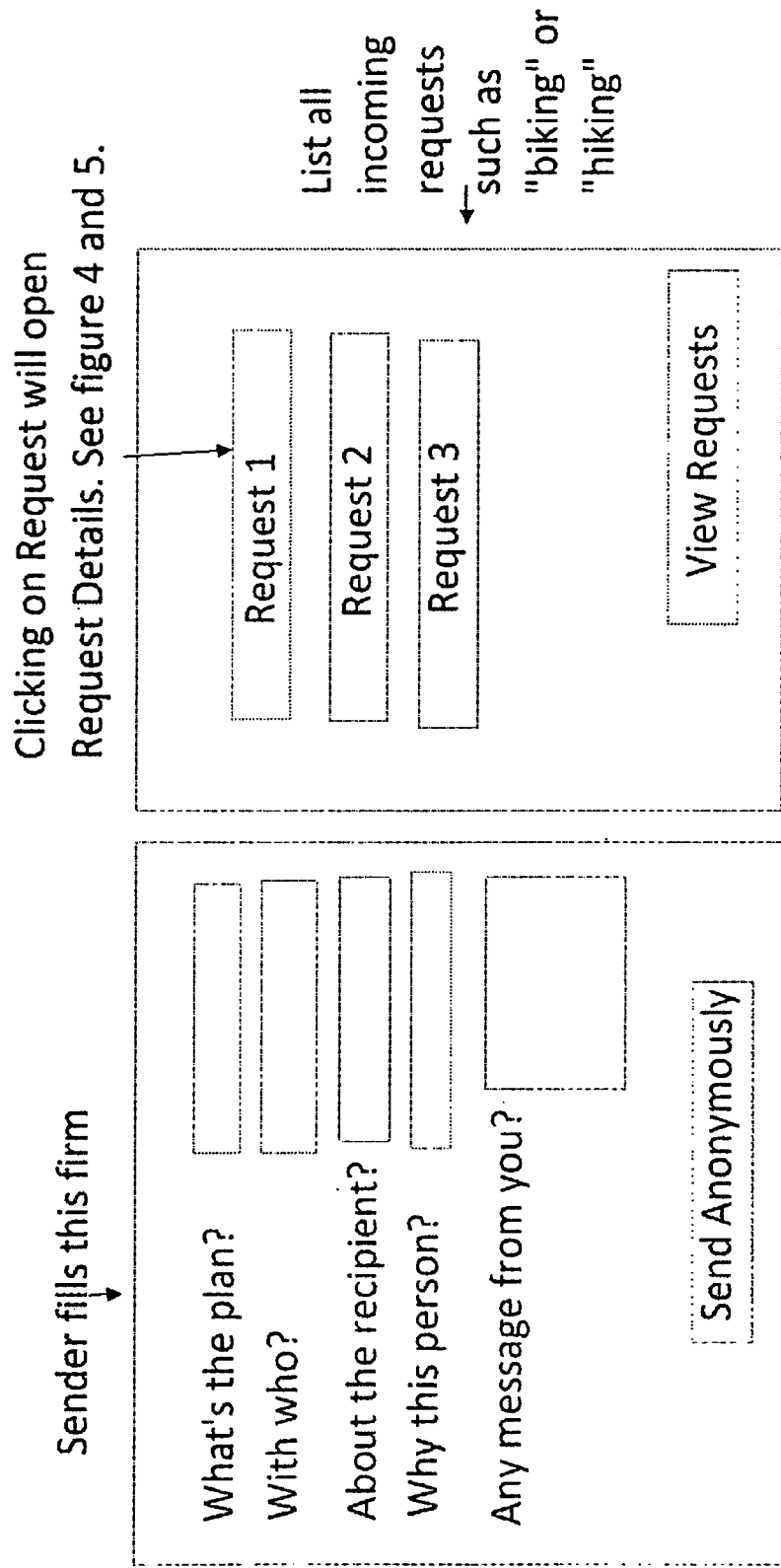
FIG. 2 is the web interface from where a member can send an anonymous request to other members or non registered members. Sender will fill the request form. Clicking on send button will check several conditions whether the sender and receiver are from same geography (this is true only if the receiver is also a member). If the receiver is not in the same geography for example 200 miles (note that this arbitrary number is subject to change from time to time), the sender cannot send the request. For example, if User A is from India, it will allow send requests to be sent only in India. If User B is from US, it will allow send request only in US. If User B tries to send request to a person in India, it may display an error. Sender's location or sender's IP address and receiver location or IP address is used to compare the distance between the sender and receiver.
Figure 3:
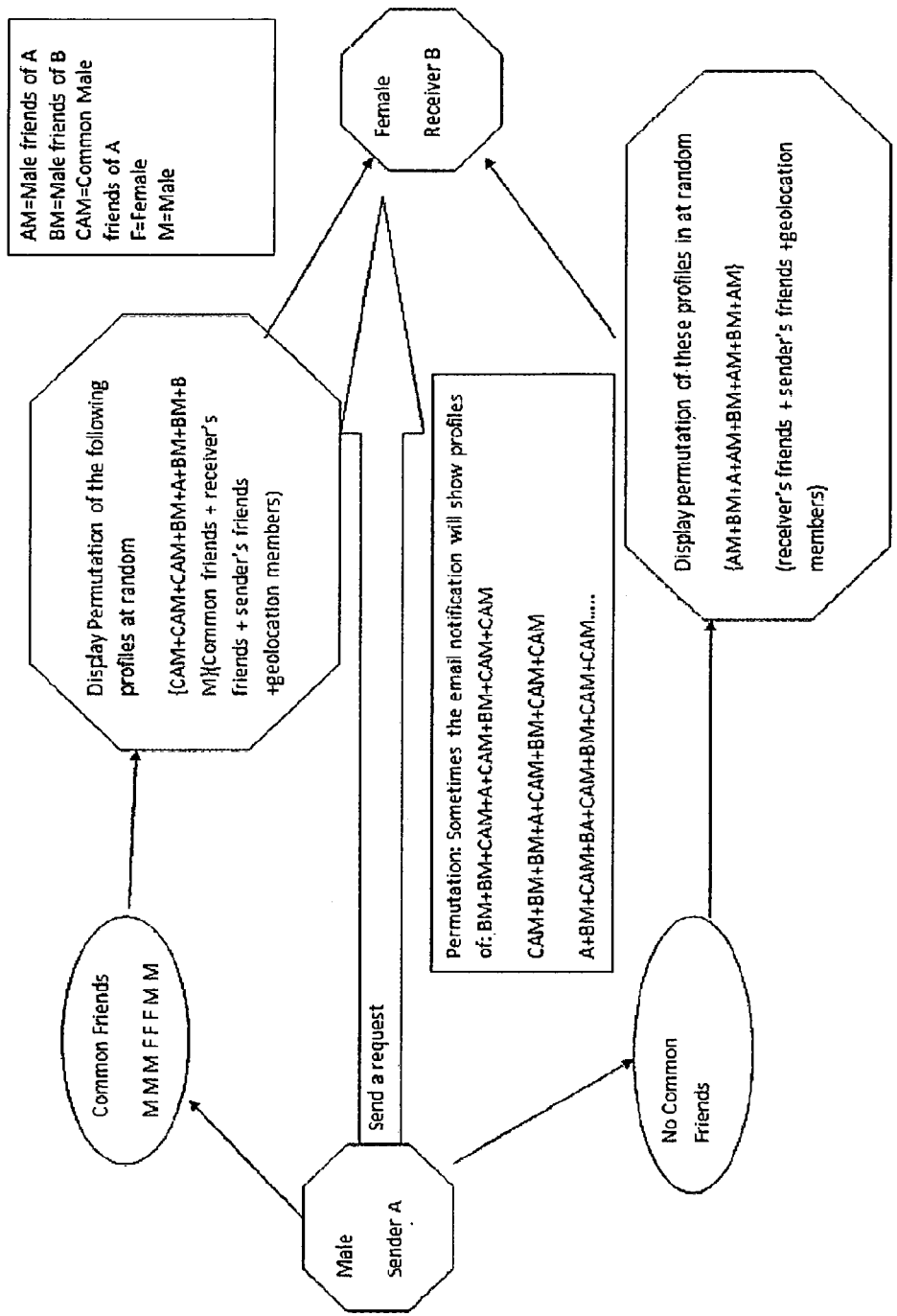
FIG. 3 explains an example of the profiles selection process. In this example in figure, female Receiver B receives a list of profiles that includes Male Sender A's profile as other Male profiles selected in the following way. The order of these profiles will never be fixed. If it is fixed, Receiver can predict. For example, A, the Sender is always the first in the list then the Receiver will be able to determine that the Sender is always the first in the list. So, order will change in every notification.
Figure 4:
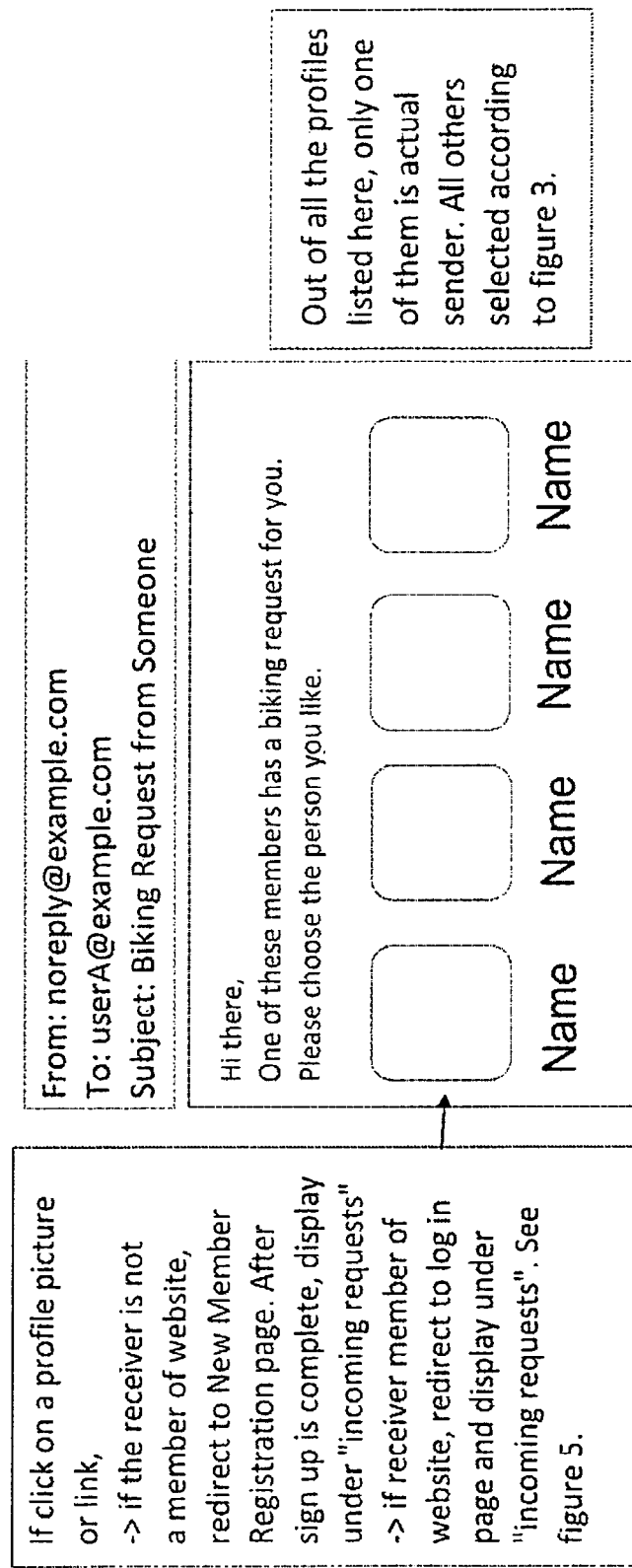
FIG. 4 shows the email notification of the request that the receiver receives when the sender sends a request. It lists the profile of the sender and other users as selected in FIG. 3. It will have options to Accept or Delete. Clicking on Accept to right sender will send match email and notifications. Clicking on "Accept" to wrong profile will trigger another request. The receiver becomes sender. The request will die if clicked on Delete.
Figure 5:
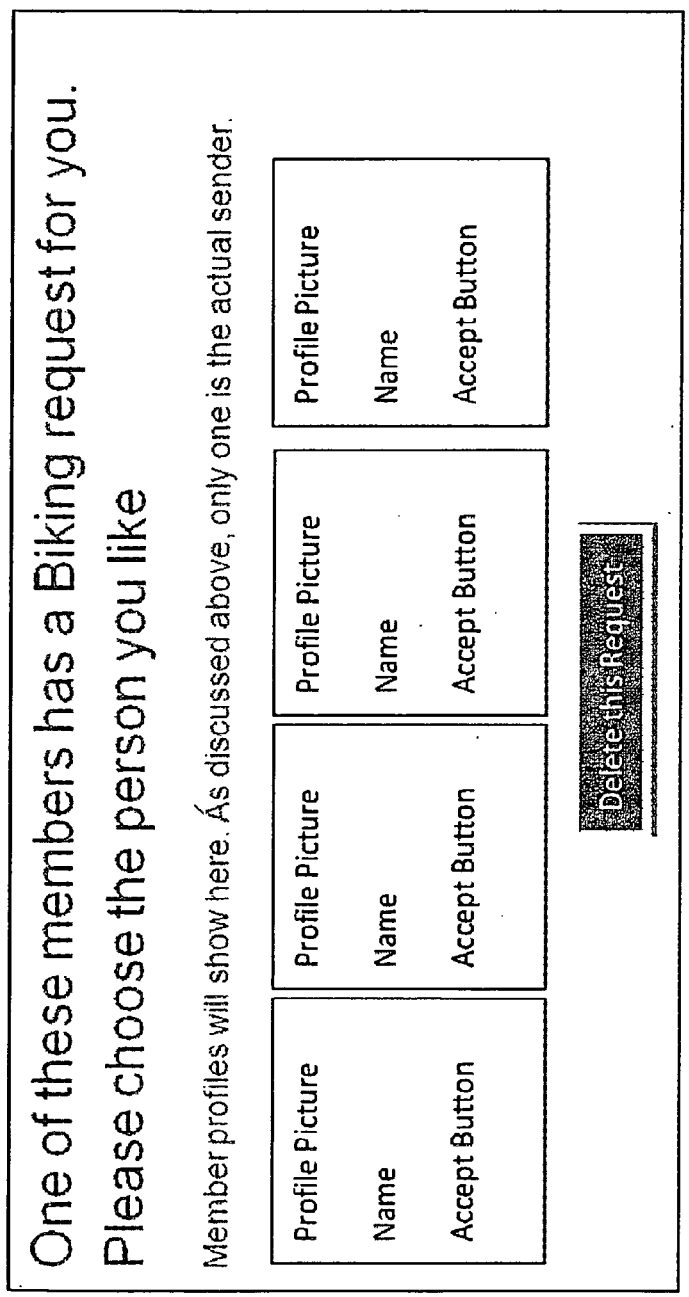
FIG. 5 shows web notification that the receiver receives when the sender sends a request. The notification appears on the notification page of the receiver. It will list the profile of the sender and other users as selected in FIG. 3. It will list the profile of the sender and other users as selected in FIG. 3. It will have Accept or Delete Options. Clicking on "Accept" to correct sender will send match email and notifications. Clicking on "Accept" to the profile other than the sender will trigger another request. The receiver becomes sender. Clicking on Delete will delete request.
Figure 6:
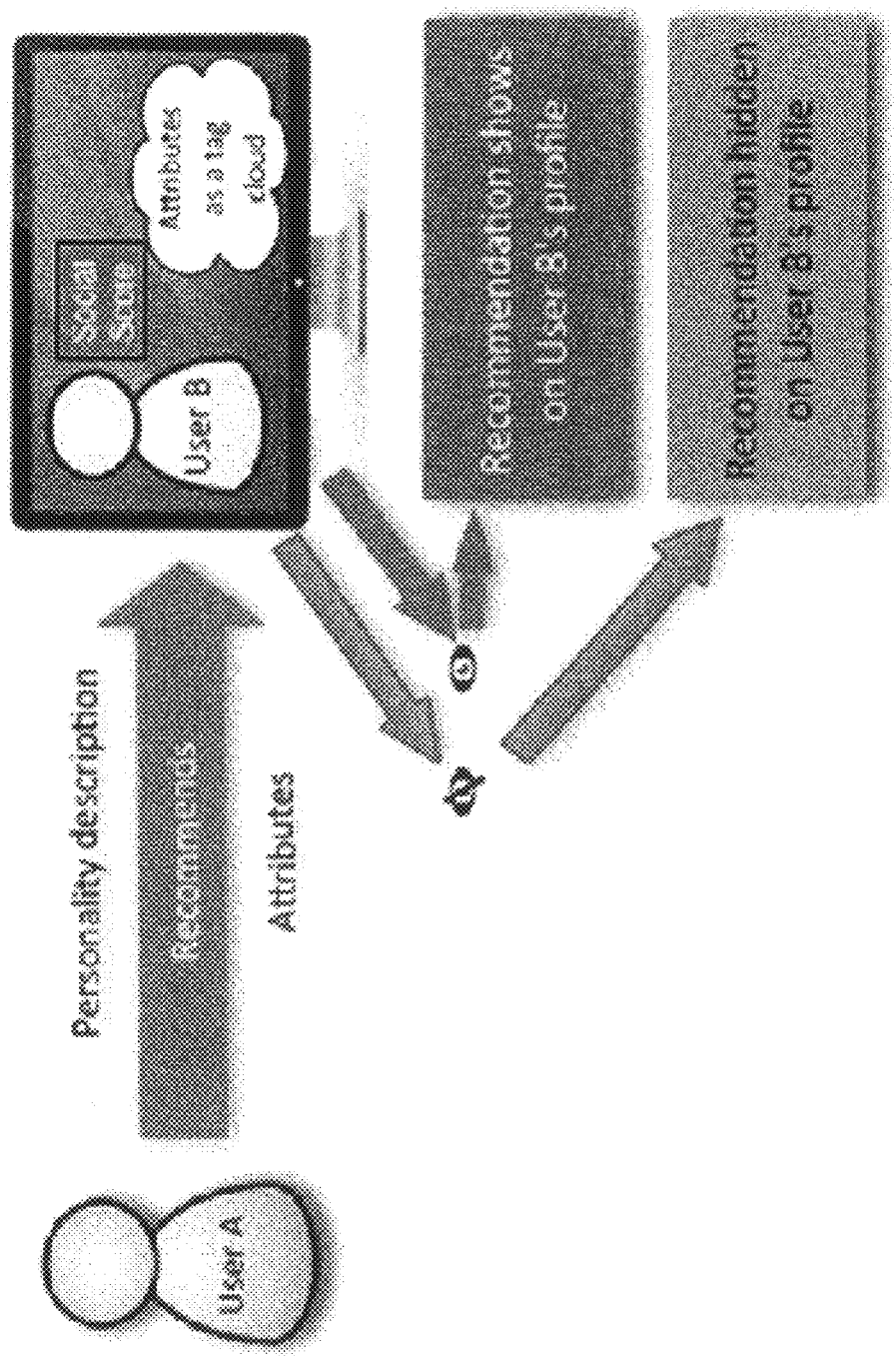
FIG. 6 explains member personality generation. User A reviews user B which includes writing tagging user B with personality attributes. Each attribute has a numeric value. Using weighted average algorithm, the receiver is assigned a social score. Each new review creates a new weighted average and social score changes. Simultaneously, the attributes are displayed in Word/Tag cloud to show the member's personality overall. User B has a choice to hide or display what User A wrote.
Figure 8:
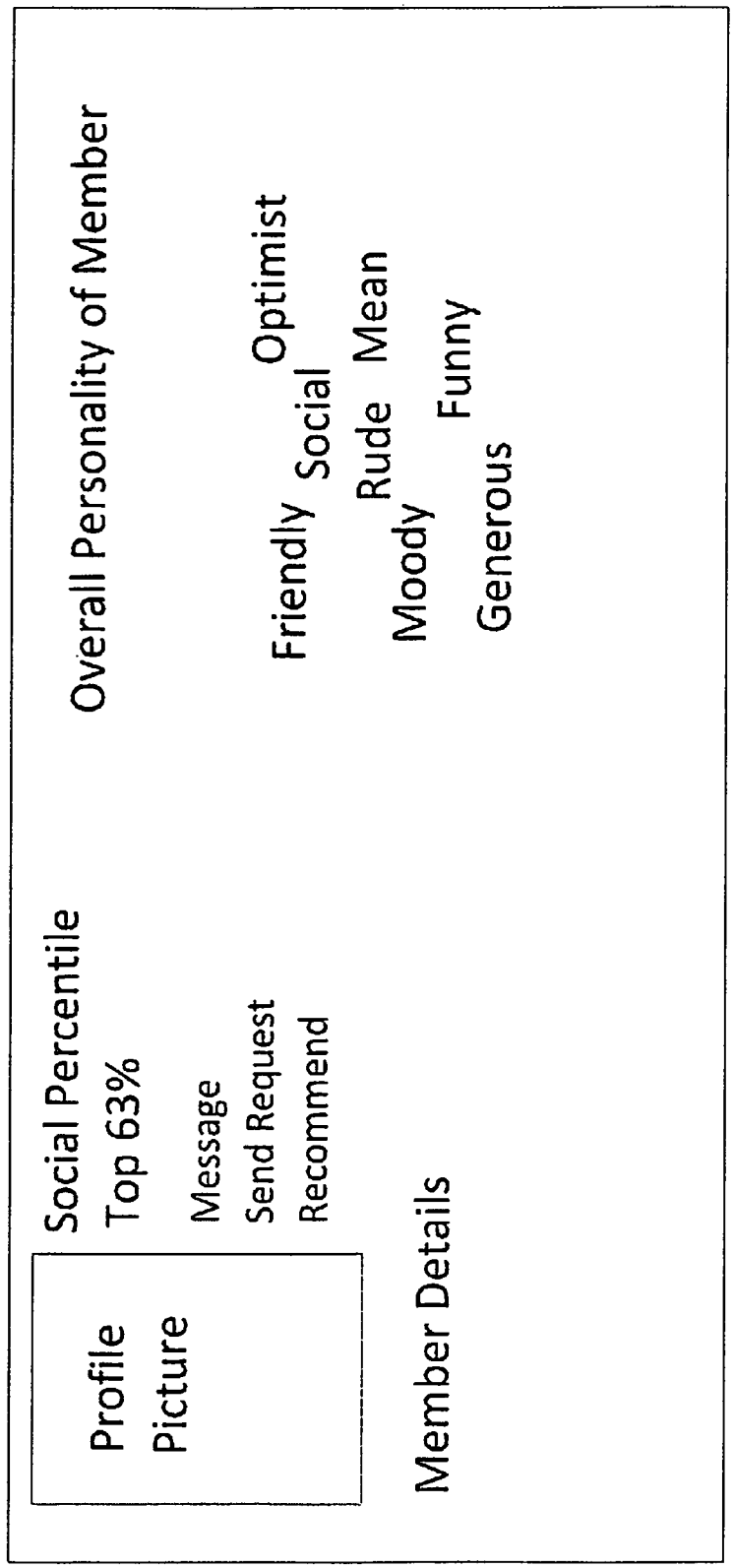
FIG. 8 is the web interface that shows social percentile derived from the attributes collected. Personality attributes being displayed in Word Cloud format for a quick glance of overall personality of a member.
Figure 9:
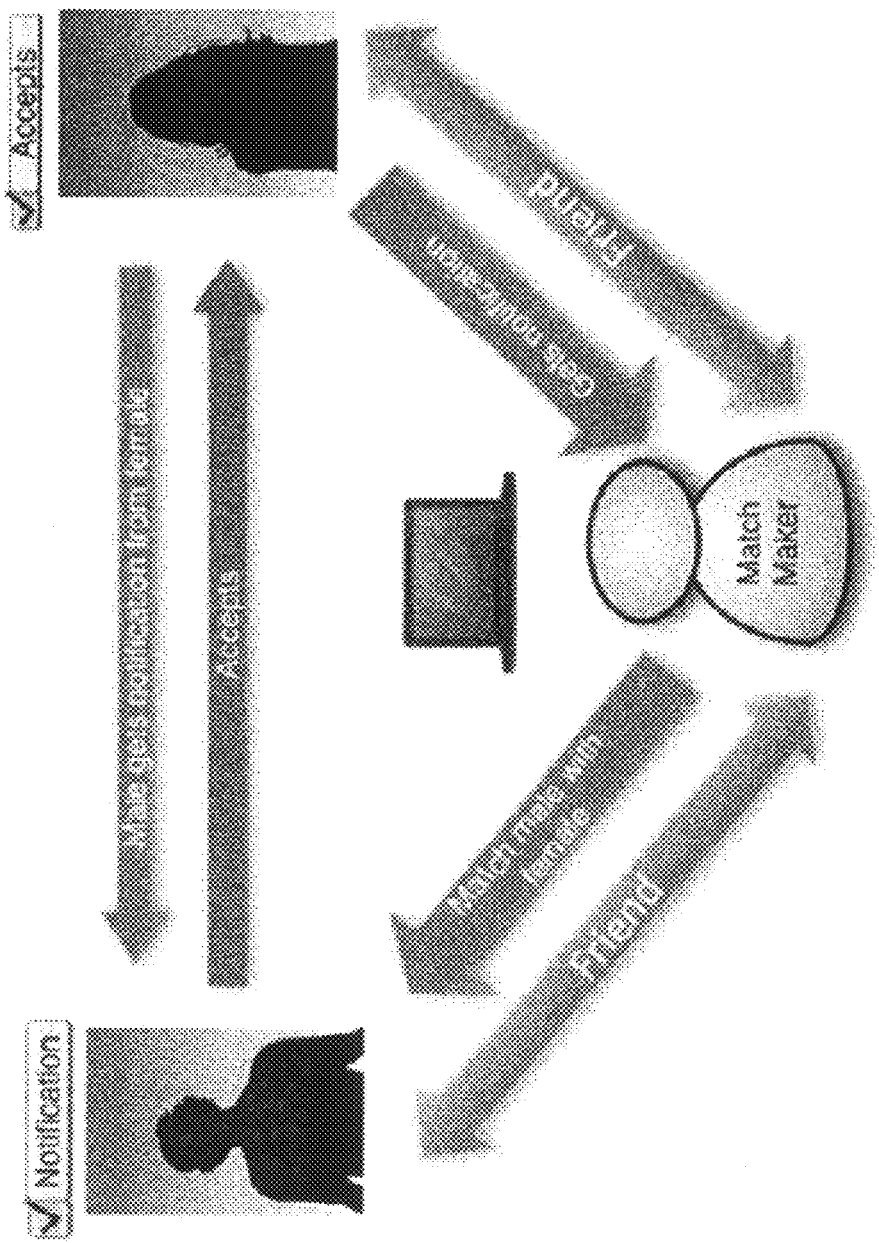
FIG. 9 explains the match making process. If a member is listed as "Single", a pop up notification allows friends to match the member with another person. Use Case: A matches B with C. B receives a notification that A has matched B with C. If B accepts, notification is sent to C. If C accepts A's suggestion and B's approval, a successful match is made. Both A and B are notified. If B rejects A's match suggestion, link dies. If B accepts but C rejects, link dies.

In this example, User B will send a request to User C.
Steps:
1) User B sends a request to User C
2) User C receives notification that one member of the website is interested in her. This notification will include several profiles. Only one of them is the sender. All others are selected based on FIG. 3. Since User C is a female, the notification will include only Male profiles. This is how male profiles are selected.
   a) Out of all profiles, User B's profile will be there because he is the sender.
   b) User A's profile will be there because he is the common Male friend of User B (the sender) and User C (the receiver)
   c) Other six males will be selected this way:
      I) 6 males from User C's friends list
      II) If User C does not have 6 males in her friends lists, it will add the remaining from User B's friends list.
      III) If User B and User C both don't have 6 males friends, display male profiles matching User C's age, interests, school and various other information from User C's geolocation (IP address) or location from her profile.
      Collect all profiles, shuffle it (or permutation) and display to User C's notification. For example, User B's profile may appear any order, User A's profile may appear any order and random profiles may appear any order in the email notification that User C receives.
3) If receiver clicks on the User A or any other user, receiver receives the same type of request as the step above. In this case, the receiver becomes the sender of the new request.

2. Review/Ranking/Social Score

Websites such as LinkedIn provided a platform for users to ask for professional review and sites like Yelp helped businesses to be reviewed by customers. Social scoring, personality attributes and personal recommendations will help you decide whether the prospective match or a date would be worth your time.

In this invention, you can recommend, and tag your friends with personality attributes. To write a recommendation or rate your friend, you can simply click on recommend tab, write recommendation, pick from over 35 attributes that best describes your connection that is displayed in their profile.

These attributes are converted into a social score, a social percentile and displayed in user's profile. Every user has a score between 0 and 100 which represents as overall social personality of a user. A user in top 99% is considered a much better person than a person with lower percentile. Users are able to see where they stand relative to their brothers, sisters or friends.

3. Match Single Friends

All dating websites let you create a profile and try to build your personality based on a series of questionnaires. However, most often, the assessment is not a true representative of your personality. First, dating websites ask question from the user who is most often biased about his personality. Second, the offline history of the user is largely unknown. Third, the questionnaire is lengthy, resulting the profile creator to rush which often leads to choosing inaccurate options just to finish the profile creation process.

Most often, we all know some friends who are singles. As we know them closely, we could be in a better spot to match them. Once you log in to iPintoo website, you can view your single friends. If you think that one of your friends would be a better match for the other, you can simply initiate the match making process. For example, you the match maker believe that your friend, a male, is a good match for your friend, a female, you can match them. Once you initiate the request, the male feels the potential match "credible" because it is coming from you. When the male accepts the match suggestion, the female is notified. Since the female knows that the match was initiated by you and the male is a friend of yours, the female gets additional confidence that the match would most likely be a suitable candidate. In this way, the female would almost never be on a date with a sex offender or with someone she knows nothing about.

4. Local/Map Search

Using a mobile device, this invention will use geo-location with GPS to allow a user search for prospective dates within their immediate vicinities. The search will be map based wherein the members will be displayed on the map on the vicinity of the member's IP address. Members also have the ability to search other members by distance from member IP, gender, interactivity, age, and several other profile attributes. For example, User A is interested in searching for a member located within 10 miles of this zip code. By navigating on the respective page of the web application, entering his/her zip code, and selecting the 10 miles radius, User A will be able to view a map with number of web application users located within 10 miles. In addition, clicking on any user from the map, User A will then able to send a request to that user using the usual send request form.

The search will follow the same logic as sending request. For example, if User A is a male, the users displayed on the map will be all females. Likewise, if User A is a female, the users displayed on the map will be all males.

What is claimed is:

1. A computer system for providing user-to-user online networking service over a network providing online networking service to a plurality of users, including members and non-members, comprising:
   a processor;
   a memory storing instructions that, when executed by said processor, cause said computer system to:
      provide functionality for said plurality of users to compose personal reviews for other users and tag said other users with words describing personality attributes;
      provide a first user of said plurality of users to initiate and send an anonymous message to a recipient via said network, wherein said anonymous message includes profile of said first user;
      insert at least two additional profiles selected from at least two of said plurality of users to said anonymous message before sending said anonymous message thereby making sender of said anonymous message unknown to said recipient;
      allow the recipient to respond to said anonymous message with:
         a) deleting said anonymous message; or
         b) selecting one of the profiles in said anonymous message;
      reveal said first user as the sender of said anonymous message to the recipient if the recipient selected the profile of said first user in said anonymous message; and
      generate a new anonymous message, if the recipient selected a profile other than the profile of said first user, to include profile of the recipient and at least two additional profiles selected from another at least two of said plurality of users, and deliver the new anonymous message to the user of the selected profile.

2. The computer system of claim 1, wherein said anonymous message and said new anonymous message including a request for activity.

3. The computer system of claim 1, wherein said tagged words are displayed in word cloud.

4. The computer system of claim 1, further comprising instructions that, when executed by said processor, cause said computer system to: allow a first member of said members to make match for a second member with another user and sending a matching request to said second member and said another user.

5. The computer system of claim 4, further comprising instructions that, when executed by said processor, cause said computer system to: send a notification to notify said first member, said second member and said another user when one of said second member or said another user accepts the matching request.

6. The computer system of claim 1, further comprising instructions that, when executed by said processor, cause said computer system to: perform, by a first member of said members, a map search of nearby members based on the location of said first member; and
   display said nearby members on map.

7. The computer system of claim 6, wherein said map search is performed based on dynamic geolocation IP of said first member.

8. The computer system of claim 1, further comprising instructions that, when executed by said processor, cause said computer system to calculate a social percentile of a corresponding user based on the tagged words and said reviews of said corresponding user.

9. A computer-implemented method for providing user-to-user online networking service over a network providing online networking service to a plurality of user, including members and non-members, comprising the steps of:
   providing functionality for said plurality of users to compose personal reviews for other users and tag said other users with words describing personality attributes;
   providing a first user of said plurality of users to initiate and send an anonymous message to a recipient via said network, wherein said anonymous message includes profile of said first user;
   inserting at least two additional profiles selected from at least two of said plurality of users to said anonymous message before sending said anonymous message thereby making sender of said anonymous message unknown to said recipient;
   allowing the recipient to respond to said anonymous message with:
      a) deleting said anonymous message; or
      b) selecting one of the profiles in said anonymous message;
   revealing said first user as the sender of said anonymous message to the recipient if the recipient selected the profile of said first user in said anonymous message; and
   generating a new anonymous message, if the recipient selected a profile other than the profile of said first user, to include profile of the recipient and at least two additional profiles selected from another at least two of said plurality of users, and delivering the new anonymous message to the user of the selected profile.

10. The method of claim 9, wherein said anonymous message and said new anonymous message including a request for activity.

11. The method of claim 9, wherein said tagged words are displayed in word cloud.

12. The method of claim 9, further comprising the step of: allowing a first member of said members to make match for a second member with another user and sending a matching request to said second member and said another user.

13. The method of claim 12, further comprising the step of: sending a notification to notify said first member, said second member and said another user when one of said second member or said another user accepts the matching request.

14. The method of claim 9, further comprising the step of: performing, by a first member of said members, a map search of nearby members based on the location of said first member; and display said nearby members on map.

15. The method of claim 14, wherein said map search is performed based on dynamic geolocation IP of said first member.

16. The method of claim 9, further comprising the step of: calculating a social percentile of a corresponding user based on the tagged words and said reviews of said corresponding user.

* * * * *